(12) United States Patent
Bailly et al.

(10) Patent No.: US 6,650,179 B2
(45) Date of Patent: Nov. 18, 2003

(54) INTEGRATED ERROR AMPLIFIER

(75) Inventors: Alain Bailly, Rousset (FR); Lionel Esteve, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 09/972,185

(22) Filed: Oct. 5, 2001

(65) Prior Publication Data

US 2002/0070800 A1 Jun. 13, 2002

(30) Foreign Application Priority Data

Oct. 6, 2000 (FR) .......................................... 00 12809

(51) Int. Cl.[7] .................................................. H03F 1/14
(52) U.S. Cl. .......................................................... 330/51
(58) Field of Search ................................ 323/282, 285; 330/51, 61 R, 307

(56) References Cited

U.S. PATENT DOCUMENTS

| | | | |
|---|---|---|---|
| 4,599,578 A | | 7/1986 | Seevinck |
| 4,855,687 A | * | 8/1989 | Hebert Raymond T. .... 330/304 |
| 5,796,303 A | * | 8/1998 | Vinn et al. .................... 330/51 |
| 5,889,393 A | * | 3/1999 | Wrathall ..................... 323/282 |

FOREIGN PATENT DOCUMENTS

DE      34 32 561 A1     3/1986

OTHER PUBLICATIONS

French Search Report from French Patent Application No. 00/12809, filed Oct. 6, 2000.
Patent Abstracts of Japan vol. 1995, No. 07, Aug. 31, 1995 & JP 07 094978 A (Hitachi Ltd.).

* cited by examiner

*Primary Examiner*—Matthew V. Nguyen
(74) *Attorney, Agent, or Firm*—Wolf, Greenfield & Sacks, P.C.; James H. Morris

(57) ABSTRACT

An error amplifier providing an analog error signal, including an operational amplifier, an output terminal of which controls an active load of discharge of a resistive and capacitive network supplied by a reference current source, and circuitry for copying the reference current in an input resistor, a terminal of which receives a measurement signal and the other terminal of which is connected to a non-inverting input of the operational amplifier, the error signal being available across the resistive and capacitive network.

7 Claims, 1 Drawing Sheet

INTEGRATED ERROR AMPLIFIER

BACKGROUND OF THE INVENTION

1. Field of the Invention

The present invention relates to the field of regulated electronic systems, and more specifically to integrated circuits including an error amplifier as an input of a regulation system.

2. Discussion of the Related Art

An example of application of the present invention is the regulation of a supply voltage, for example, in a voltage converter of switched-mode type power supply. In such a converter, an error amplifier is used at the input of a circuit for controlling a pulse-width modulated switch. This amplifier compares a voltage proportional to the voltage provided by the converter to a reference voltage, and provides an analog signal proportional to the difference between the two voltages. More generally, the present invention applies to any electronic regulation using a differential amplifier of an electric signal representing an image of the signal regulated with respect to an internal reference.

FIG. 1 shows a conventional example of an integrated circuit error amplifier. Such an amplifier uses an operational amplifier 1, an output of which provides an error signal e. As an input, amplifier 1 receives a reference voltage $V_{ref}$ which is compared to a voltage applied to its other input. Voltage $V_{ref}$ is provided by a voltage reference circuit 2 (REF), the output of which is connected to the non-inverting input of amplifier 1. Circuit 2 is generally integrated with amplifier 1 in the same circuit. In FIG. 1, the limit of the integrated circuit has been schematically illustrated by dotted lines 3. Other components are of course integrated with amplifier 1. However, the amplifier requires two terminals 4 and 5 of external connection to integrated circuit 3. Terminal 5 represents the output of amplifier 1. Terminal 4 represents the non-inverting input of amplifier 1. A voltage $V_{reg}$, which is a function of the regulated variable, is applied to terminals 6 and 7 of a dividing bridge formed of a resistor R1 and of a resistor R2 in series, terminal 7 representing the ground. Midpoint 8 of this series connection is connected to terminal 4. The resistive dividing bridge is necessary since the voltage reference of amplifier 1 is integrated. The adaptation of the proportionality coefficient between reference voltage $V_{ref}$ and voltage $V_{reg}$ to be regulated is performed by the choice of resistances R1 and R2. The relation linking the regulated voltage to the reference voltage is: $V_{reg}=(1+R1/R2) V_{ref}$.

The feedback loop of amplifier 1 is formed of a resistor R3 in series with a capacitor C3. Resistor R3 and capacitor C3 of the loop are generally external to circuit 1.

An error amplifier such as illustrated in FIG. 1 has a transfer function of proportional-integral type. The proportionality coefficient of the transfer function is given by the ratio between resistances R1 and R3. The integration constant is given by the product of capacitance C3 by resistance R1.

An error amplifier such as illustrated in FIG. 1 is present, for example, in an integrated circuit sold by STMicroelectronics Company under trade name UC3842. The output (not shown) of this integrated circuit provides a pulse train to a switch to form a switched-mode converter. Voltage $V_{reg}$ then corresponds to the voltage provided by the converter.

A disadvantage of conventional error amplifiers is that the forming of an integrated reference voltage source 2 requires specific settings and adjustments upon manufacturing of the integrated circuit. This adjustment of reference voltage $V_{ref}$ is most often performed by a resistive fuse network. The reference voltage source is generally obtained from a reference current source further used in the integrated circuit to bias the other stages. This current source is itself adjusted, for example, by a resistive fuse network. The use of two reference magnitudes makes the circuit complex and increases the test cost of the circuit.

Another disadvantage of the error amplifier of FIG. 1 is that resistances R3 and C3 cannot be integrated. This is due to the high values of these components, for reasons of stability of the regulation loop in which amplifier 1 is placed. Capacitor C3 has a value (typically, several tens of nanofarads) much greater than a few tens of picofarads, which is generally considered as an integration limit.

Another disadvantage is that two terminals 4 and 5 of access to integrated circuit 3 are necessary to implement the error amplifier.

SUMMARY OF THE INVENTION

The present invention aims at overcoming at least one of the disadvantages of a known error amplifier.

The present invention more specifically aims at providing a novel error amplifier which no longer needs a reference voltage.

The present invention also aims at providing a solution which reduces or minimizes the number of external components of a circuit integrating the error amplifier.

The present invention further aims at reducing or minimizing the number of necessary terminals of the integrated circuit.

To achieve these and other objects, the present invention provides an error amplifier providing an analog error signal, including an operational amplifier, an output terminal of which controls an active load of discharge of a resistive and capacitive network supplied by a source of a reference current, and means for copying the reference current in an input resistor, a terminal of which receives a measurement signal and the other terminal of which is connected to a non-inverting input of the operational amplifier, the error signal being available across the resistive and capacitive network.

According to an embodiment of the present invention, the transfer function is set by the values of the resistive and capacitive network.

According to an embodiment of the present invention, the inverting and non-inverting terminals of the operational amplifier are each connected, by a resistor, to a reference potential.

According to an embodiment of the present invention, a first power terminal of the active load is connected, by the reference current source, to the supply voltage of the integrated circuit and forms an output terminal providing the error signal.

According to an embodiment of the present invention, the inverting input of the operational amplifier is connected to a second power terminal of the active load.

According to an embodiment of the present invention, the network is formed of a resistor in parallel with a capacitor, connected between the first power terminal of the active load and the reference potential.

According to an embodiment of the present invention, the error amplifier is made in the form of an integrated circuit, all resistors and capacitors forming it being integrated except for the input resistor.

The foregoing objects, features and advantages of the present invention will be discussed in detail in the following non-limiting description of specific embodiments in connection with the accompanying drawings.

DETAILED DESCRIPTION

Figure 1:
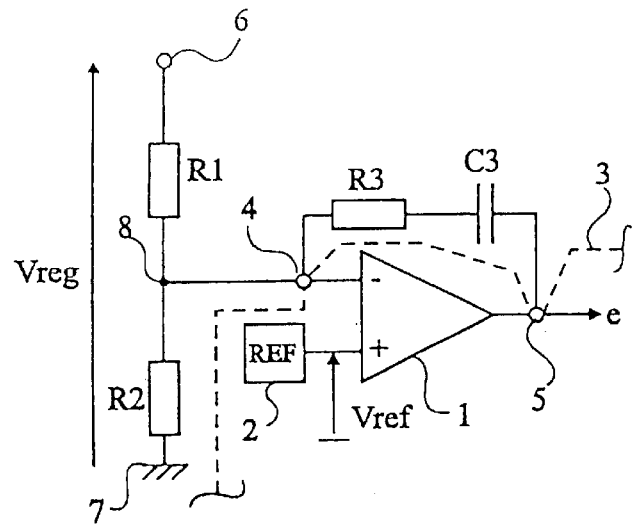
FIG. 1, previously described, shows a conventional example of an error amplifier.

The same elements have been designated with the same references in the different drawings. For clarity, only those components of a circuit integrating an error amplifier of the present invention have been shown in the drawings and will be described hereafter. In particular, the circuits for which the error signal generated by the amplifier is intended are not shown.

A feature of the present invention is to provide an error amplifier in which currents, and no longer voltages, are compared.

Figure 2:
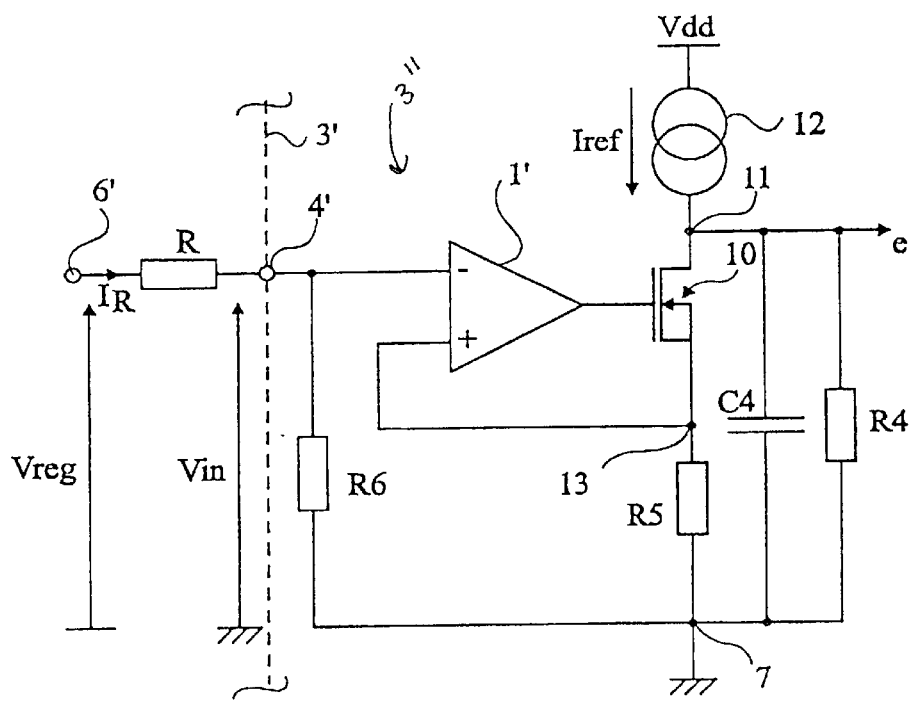
FIG. 2 shows an embodiment of an error amplifier according to the present invention.

FIG. 2 shows an embodiment of an error amplifier according to the present invention. As in the representation of FIG. 1, the limit of a circuit integrating the error amplifier of the present invention has been illustrated by dotted lines 3'.

An error amplifier according to the present invention includes an operational amplifier 1', the non-inverting input of which is directly connected to a terminal 4' of integrated circuit 3" intended for receiving a measurement signal. In the example of a regulation of a voltage $V_{reg}$, voltage $V_{reg}$ is applied on a first terminal 6' of a resistor R, the other terminal of which is connected to terminal 4'. The output of amplifier 1' is connected to the control terminal of an active load 10 (for example, a MOS transistor). A first power terminal 11 of active load 10 forms the comparison point and is connected, by a reference current source 12 ($I_{ref}$), to supply voltage $V_{dd}$ of the integrated circuit. Terminal 11 also forms the output of the error amplifier providing signal e. The second power terminal 13 of active load 10 is directly connected to the inverting input of amplifier 1'. Terminal 11 is connected to ground 7 by a parallel resistive and capacitive circuit formed, for example, of a resistor R4 in parallel with a capacitor C4. Terminal 13 is grounded by a resistor R5. Terminal 4' (and thus the non-inverting input of amplifier 1') is also connected to ground 7 by a resistor R6.

The operation of an error amplifier according to the present invention is the following. Amplifier 1' controls a copying of reference current $I_{ref}$ on the current in external input resistor R. This current copying is obtained due to resistors R5 and R6. Preferably, resistance R5 will be greater than resistance R6 (for example, with a ratio ranging between 10 and 100). The current in network R4–C4 is thus reduced or minimized. Reference current $I_{ref}$, provided by output 12, flows through output resistive and capacitive network R4–C4. When the current in resistor R (and thus also in resistor R6 due to the high input impedance of amplifier 1') is smaller than the reference current, transistor 10 conducts less current than source 12. The excess reference current supplies network R4–C4. Output voltage $V_e$ representing the error signal then tends to increase. When the current in resistor R is greater than the reference current, the conduction of transistor 10 causes a discharge of capacitor C4 into resistor R5. This results in a drop of output voltage $V_e$. The foregoing only takes account of the steady-state operation of the error signal on a mean value.

The relation linking voltage $V_{reg}$ to reference current $I_{ref}$ is: $V_{reg}=R/I_{ref}+V_{in}$, where $V_{in}$ represents the voltage across resistor R6. Resistor R6 is, preferably, small to reduce or minimize the influence of voltage $V_{in}$ on voltage $V_{reg}$ which is desired to be regulated.

Resistor R4 and capacitor C4 are sized according to the integration coefficient of the desired transfer function.

Figure 3:
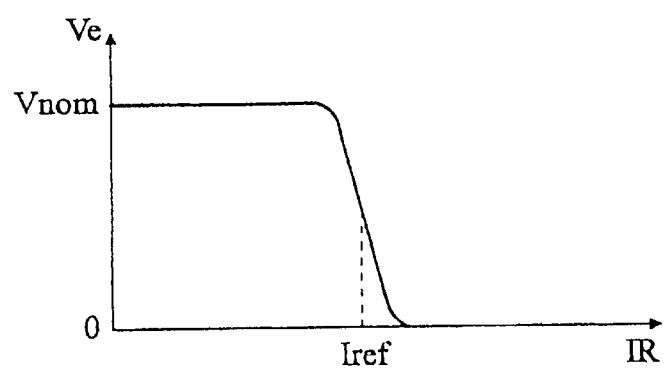
FIG. 3 illustrates the transfer function of an error amplifier according to the present invention.

FIG. 3 illustrates the transfer function of the amplifier of FIG. 2. FIG. 3 shows an example of course of voltage $V_e$ according to current $I_R$ in resistor R. It should be noted that the variation of error voltage $V_e$ is concentrated in the vicinity of reference current $I_{ref}$ provided by source 12. A nominal voltage Vnom indicating the saturation voltage in the high state of the error amplifier has been illustrated. When current $I_R$ moves away from current $I_{ref}$, voltage $V_e$ becomes null or equal to voltage Vnom according to the variation direction of the current. The strong slope of the variation around current $I_{ref}$ depends on the static gain of the general error amplifier, which is generally high.

The error amplifier of the present invention respects the provision of an error voltage ($V_e$) at the output and the use of a measurement voltage ($V_{reg}$) as an input. Thus, the implementation of the present invention is perfectly compatible with existing circuits using an error amplifier for regulation.

An advantage of the present invention is that the use of a current comparison avoids using a reference voltage source. Now, in integrated circuits, a reference current source which is used, by copying of the current by means of mirror assemblies, to supply the different stages is always available. Accordingly, current source 12 of the amplifier of the present invention is already available in the entire integrated circuit. The number of necessary components is thus reduced.

Another advantage of the present invention is that it reduces or minimizes the number of components external to the integrated circuit. Indeed, by using a comparison by current copying, the values involved (a few microamperes) make components R5, R6, R4 and C4 compatible with an integration. For example, resistance R6 is on the order of a few hundreds of ohms. Resistance R5 then is on the order of a few kiloohms. Capacitance C4 is, for example, on the order of some ten picofarads. Resistance R4 then is, for a cut-off frequency of a few kilohertz, on the order of a few megaohms. For integration, this last resistor is often formed, preferably, by an active element (depletion MOS transistor).

Another advantage of the present invention is that a single terminal (4') is now necessary for the access to the error amplifier.

Of course, the present invention is likely to have various alterations, modifications, and improvements which will readily occur to those skilled in the art. In particular, the values to be given to the resistances and capacitance depend on the application and may be adapted based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An error amplifier providing an analog error signal, including an operational amplifier having an output terminal that controls an active load of discharge of a resistive and capacitive network supplied by a source of a reference current, and means for copying the reference current in an input resistor, a terminal of which receives a measurement signal and the other terminal of which is connected to a non-inverting input of the operational amplifier, the error signal being available across the resistive and capacitive network.

2. The error amplifier of claim 1, wherein a transfer function is set by values of the resistive and capacitive network.

3. The error amplifier of claim 1, wherein inverting and non-inverting terminals of the operational amplifier are each connected, by a resistor, to a reference potential.

4. The error amplifier of claim 1, wherein a first power terminal of the active load is connected, by the reference current source, to the supply voltage of the integrated circuit and forms an output terminal providing the error signal.

5. The error amplifier of claim 4, wherein the inverting input of the operational amplifier is connected to a second power terminal of the active load.

6. The error amplifier of claim 4, wherein said network is formed of a resistor in parallel with a capacitor, connected between the first power terminal of the active load and the reference potential.

7. The error amplifier of claim 1, made in the form of an integrated circuit, all resistors and capacitors forming it being integrated except for the input resistor.

* * * * *